(No Model.)
W. B. HARVEY.
ELECTRICAL DISTRIBUTION.
No. 357,280. Patented Feb. 8, 1887.
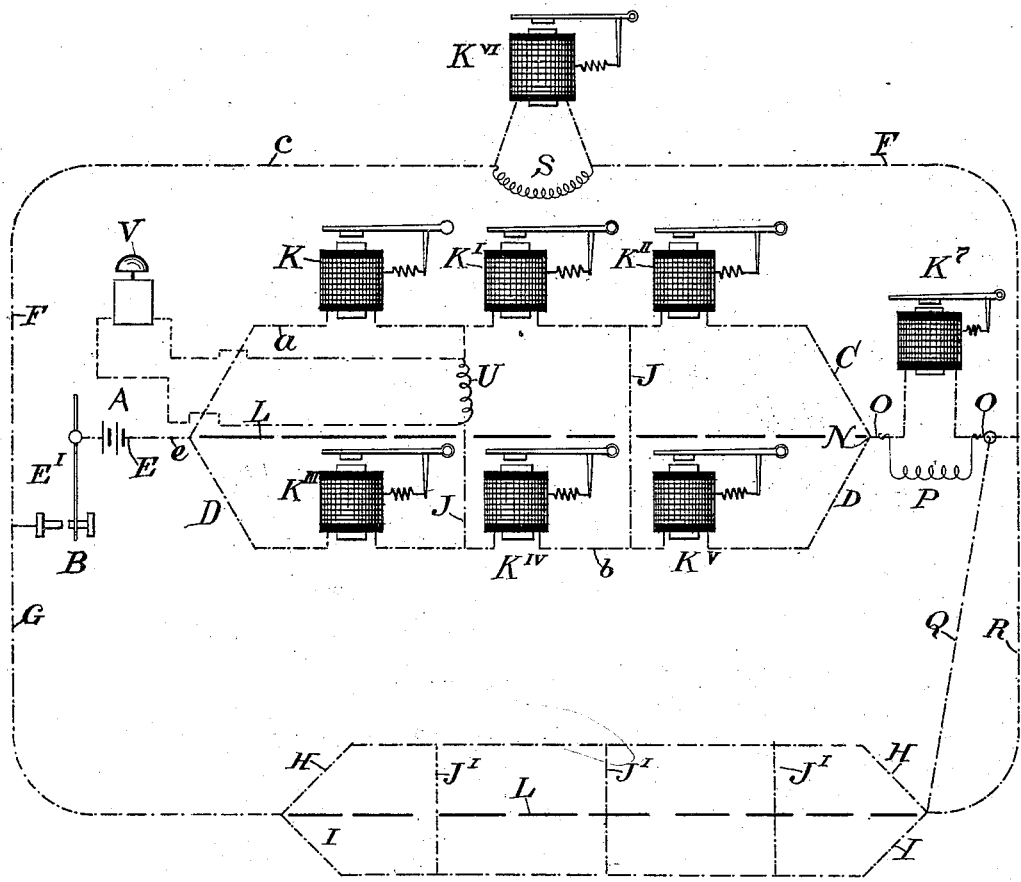
WITNESSES:
INVENTOR
Wirt B. Harvey
BY
ATTORNEY

UNITED STATES PATENT OFFICE.

WIRT B. HARVEY, OF MEMPHIS, TENNESSEE.

ELECTRICAL DISTRIBUTION.

SPECIFICATION forming part of Letters Patent No. 357,280, dated February 8, 1887.

Application filed December 15, 1885. Serial No. 185,706. (No model.)

*To all whom it may concern:*

Be it known that I, WIRT B. HARVEY, a citizen of the United States, and a resident of Memphis, in the county of Shelby and State of Tennessee, have invented certain new and useful Improvements in Electrical Distribution, of which the following is a specification.

My invention relates to the distribution of electrical energy to translating devices—such as electric clocks, electric lamps, or any similar apparatus or device dependent for its action upon electricity.

The object of the invention is to provide improved means of maintaining a closed circuit even if one or more of the devices were accidentally or purposely cut out of circuit, and to provide in an improved manner an electric signal which will operate when one of the translating devices is cut out of circuit.

The system consists in the disposition of branch circuits, cross-wires, and other elements shown and described in the sequel, reference being had to the accompanying drawing.

The figure is a general view of the system. E is a generator of electricity; B, a key or switch; F and G, branch circuits to one pole of the generator, and C and D branch circuits to the opposite pole.

My present invention is confined to the branch circuits C and D and their adjuncts, so that it will be unnecessary to describe the remaining portions of the general circuit, it being sufficient to remark that the said last-named branches meet again and unite at N, pass through the portion O of the general circuit, and into the branch circuits F and G—i. e., the branches C and D are electrically connected with both poles of the generator, so as to be included in a complete circuit. These branches at equal distances are connected by cross-wires J, and translating devices (each of the same resistance) K K' K², &c., are located in the branches between the cross-wires. In the particular disposition shown in the figure there is one translating device in each section—such as $a$ and $b$—into which the cross-wires divide the branches. Any cross-wire includes a resistance, U, from the terminals of which passes a circuit, A, including the bell V.

My invention does not necessarily include the resistance U and bell V, both of which may be omitted, as shown in the cross-wire J at the right of the figure.

K, K', K², K³, K⁴, and K⁵ are represented as magnets, which may be employed for the usual purposes of a magnet. They are typical and intended to represent any suitable translating device.

The mode of operation is that should the wire in K, for instance, break, the circuit would still be complete throughout the circuit, and, furthermore, the bell V would ring, because a current would then pass through the circuits A and U. In the normal condition no actual current passes through the cross-wires J, and therefore through A and U, because two equal currents enter these wires from both ends and neutralize each other. The ringing of the bell indicates that K or K³ is out of circuit.

The line L represents the center of the street, the translating devices being located upon each side of the street. The key B is kept closed while the system is in operation.

The invention is not limited to the precise construction hereinbefore described, as it is evident that many modifications may be made therein without departing from the spirit of the invention.

What I claim is—

1. In a system of electrical distribution, a complete circuit divided for a portion of its length into two branch circuits, cross-wires connecting said branch circuits at different points, and translating devices of equal resistance in said branch circuits, the resistances of those portions of the branch circuits between the cross-wires being equal to one another, and there being the same number of translating devices in each branch circuit between said cross-wires.

2. In a system of electrical distribution, the combination of a circuit, two branch circuits therein, including translating devices, cross-wires dividing the branch circuits into portions of equal resistance, each portion including an equal number of said translating devices, which are all of the same resistance, and an electric signal in a shunt-circuit to one of said cross-wires, substantially as described.

In testimony whereof I have hereunto written my signature, in the presence of two subscribing witnesses, this 30th day of November, A. D. 1885.

WIRT B. HARVEY.

Witnesses:
 W. H. HUGHES,
 J. E. FROST.